United States Patent [19]

Marangoni

[11] Patent Number: 4,565,514
[45] Date of Patent: Jan. 21, 1986

[54] APPARATUS FOR SHAPING IN A CALIBRATED WAY A RUBBER PRE-EXTRUDED PROFILED MEMBER FOR REGENERATING TIRES AND THE LIKE

[76] Inventor: Carlo Marangoni, Via Abetone, 49, 38068 - Rovereto Trento, Italy

[21] Appl. No.: 658,208

[22] Filed: Oct. 5, 1984

[30] Foreign Application Priority Data

Feb. 10, 1984 [IT] Italy .................................. 82202 A/84

[51] Int. Cl.[4] .................... B29H 5/01; B29H 5/28; B29C 25/00
[52] U.S. Cl. .................................. 425/328; 425/122; 425/363
[58] Field of Search .................... 425/122, 324.1, 328, 425/363

[56] References Cited

U.S. PATENT DOCUMENTS

| | | | |
|---|---|---|---|
| 3,494,990 | 2/1970 | Balint | 425/328 X |
| 3,616,496 | 11/1971 | Auglioletti et al. | 425/122 X |
| 3,762,147 | 10/1973 | Wuest | 425/363 X |
| 3,938,929 | 2/1976 | Stent et al. | 425/363 X |
| 4,017,251 | 4/1977 | Coburn et al. | 425/363 X |
| 4,111,628 | 9/1978 | Taylor | 425/363 X |
| 4,397,624 | 8/1983 | Haverkamp et al. | 425/122 X |
| 4,415,517 | 11/1983 | Timms | 425/328 X |

*Primary Examiner*—J. Howard Flint, Jr.
*Attorney, Agent, or Firm*—Bucknam and Archer

[57] ABSTRACT

The apparatus comprises a pair of calibrating rollers, rotating in opposite directions, therebetween a pre-extruded rubber profiled member may be inserted having a undefined cross-section, a driving kinematic link being further provided for driving both the calibrating rollers with the same peripheric speed.

6 Claims, 2 Drawing Figures

APPARATUS FOR SHAPING IN A CALIBRATED WAY A RUBBER PRE-EXTRUDED PROFILED MEMBER FOR REGENERATING TIRES AND THE LIKE

BACKGROUND OF THE INVENTION

The present invention relates to an apparatus for shaping in a calibrated way a preextruded rubber profiled member, particularly designed for regenerating tires and the like.

As it is known, for regenerating tires, tubular elements, cylindrical elements and other like elements, which are to be rubberized, crude rubber is generally applied which is then introduced into a mold.

Considering in particular the case of a tire, the crude rubber is applied on the tire carcass, as suitably prepared, and then molded in a mold negatively reproducing the tread pattern; then the rubber is cured, in the mold itself, thereby assuming the pattern of the mold.

Apparatus are presently commercially available which carry out the above mentioned operations by applying a profiled member of the extruded type and having a predetermined size, that is width an thickness.

Other apparatus, on the other hand, are effective to make the extruded profiled member starting from a lens shaped member and controlling the deposition rate in such a way that the applied strips are able of forming the desired cross-section.

The known apparatus, however, are scarcely accurate, because of the difficulties associated with a precise calibration of the profiled member or strip as several physical parameters are changed, such as temperature, pressure and mainly the viscosity of the rubber mix in the extruder.

SUMMARY OF THE INVENTION

Accordingly, the task of the present invention is to overcome the above mentioned drawbacks, by providing such an apparatus which is able of precisely calibrating, depending on the contingent needs, the geometry of an extruded profiled member to render it always constant, even if the above mentioned parameters are caused to vary.

Within that task, a main object of the present invention is to provide such a machine or apparatus which may be easily associated with all of the presently existing apparatus to improve their efficiency.

Another object of the present invention is to provide such an apparatus which is effective to insert into the extruded profiled member patterns of metal or textile threads, in such a way as to provide a reinforced strip particularly suitable for regenerating tire carcasses.

Yet another object of the present invention is to provide such an apparatus which can be made starting from a reduced number of components and which is very reliable in its operation.

Yet another object of the present invention it to provide such an apparatus for shaping in a calibrated way a preextruded rubber product which may be easily fabricated starting from easily commercially available components and which, moreover, has a comparatively reduced cost.

According to one aspect of the present invention, the above mentioned task and objects, as well as yet other objects which will become more apparent hereinafter, are achieved by an apparatus for shaping in a calibrated way a preextruded rubber profiled member, particularly designed for regenerating tires and the like, characterized in that it comprises a pair of calibrating rollers, rotating in opposite directions, therebetween a preextruded rubber profiled member may be inserted, said member having a undefined cross-section, driving means being further provided for driving both said calibrating rollers with a like peripheric speed.

BRIEF DESCRIPTION OF THE DRAWINGS

Further characteristics and advantages of the invention will become more apparent hereinafter from the following detailed description of a preferred, though not exclusive, embodiment of an apparatus for shaping in a calibrated way a preextruded rubber profiled member, being illustrated, by way of an indicative but not limitative example in the accompanying drawings, where.

DESCRIPTION OF THE PREFERRED EMBODIMENT

Figure 1:
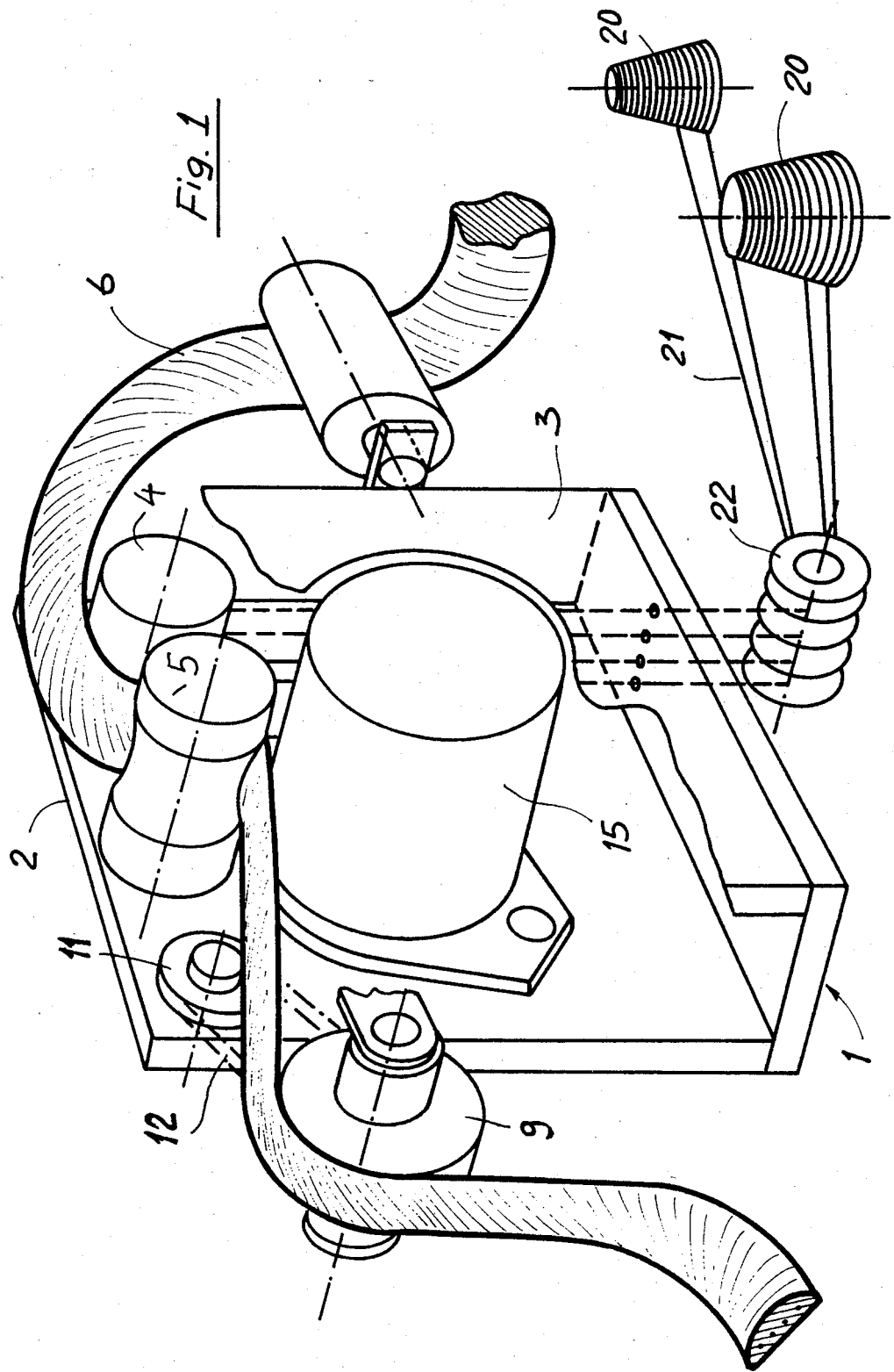
FIG. 1 is a perspective view schematically illustrating the shaping apparatus according to the invention.
Figure 2:
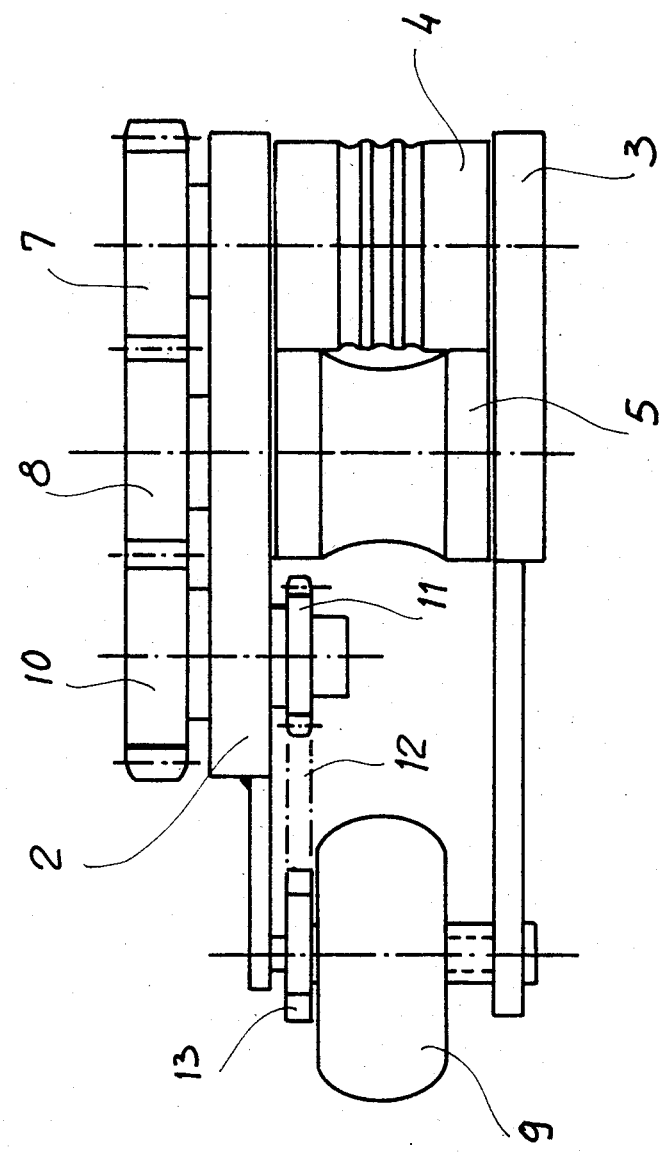
FIG. 2 is a top plan view of that same apparatus.

With reference to the above figures of the accompanying drawings, the apparatus for shaping in a calibrated way a preextruded rubber profiled member, according to the present invention, comprises a bearing frame, indicated overally at 1, which is provided with a pair of side shoulders 2 and 3, facing one another.

The shoulders, or side walls 2 and 3 rotatably support a first and second calibrating rollers 4 and 5, which contact intimely one another and are so shaped as to define a predetermined passage section, for a preextruded rubber profiled member, indicated at 6, having an uneven or undefined cross-section. The rollers 4 and 5 may have a surface configuration effective to be varied at will, for providing the profiled member, exiting said rollers, the desired cross-sectional configuration.

In the considered example, the first calibrating roller 4 is of a substantially cylindrical shape, whereas the second calibrating roller 5 is provided, on its side surface, with a recessed zone or impression, for example of lens configuration. The calibrating rollers 4 and 5 rotate in opposite directions and have a like peripheric card.

In order to assure an even peripheral speed, on the axes of the first and second calibrating rollers 4 and 5 there are respectively keyed a first gear wheel 7 and a second gear wheel 8, meshing with one another.

The apparatus further comprises a depositing or laying roller, indicated at 9, which is also rotatably supported by the shoulders 2 and 3, and kinematically coupled to the gear wheels 7 and 8, in such a way as to rotate with the same peripheral speed as the calibrating rollers 4 and 5, thereby the calibrated profiled member, exiting the roller 4 and 5, is engaged with said laying roller, without being subjected to stretch or stresses which would modify its configuration. The kinematik link coupling said laying roller 9 consists of a third gear wheel 10, meshing with the gear wheel 8 and rotatably rigid with a first pignon 11 coupled, through a chain 12, with a second pignon 13, keyed on the rotating shaft of the roller 9.

In order to drive the mentioned gears, an actuator member or assembly is provided, indicating overally at 15, which transmits motion to or drives the second gear wheel 8, which drives all of the kinematic chain or link which has been thereinabove illustrated.

The actuator member 15 is advantageously of the hydraulic type and acts as a motor for the apparatus according to the present invention; it should however be noted that the hydraulic actuator member 15 may be replaced by any other type of motor, having equivalent mechanical characteristics, that is able of providing an alwaye constant rotating speed.

It should be further appreciated that the apparatus according to the present invention, in addition to carrying out a precise calibration of the rubber extruded profiled or contoured member, is also able of inserting metal or textile weft threads into the preextruded rubber material, in such a way as to provide a reinforced profiled member.

To that end thread feeding spools 20 are provided, which supply a thread or strip material 21 engaging with transmission rollers 22 therefrom it is conveyed to the first calibrating roller which, advantageously, has a surface suitable for processing said thread material.

Thus, an apparatus is provided affording the possibility of directly inserting into the profiled rubber member threads or strips of metal of textile materials, thereby suitably reinforcing said rubber profiled member.

It should be noted that the mentioned laying roller may engage with a drum for collecting the profiled member, which drum (not shown in the drawing) will be a not motorized one, since the laying roller 9 will drive it.

Moreover, it is to be pointed out that it will be possible to replace said laying roller with a suitably processed tire carcass as mounted on an indle spindle and as suitably inflated: by moving about that carcass the above illustrated apparatus, it will be possible to carry out the regenerating operation, with a very precise coutour.

From the above disclosure it should be apparent that the invention fully achieves the intended objects. In particular, the fact should be pointed out that an apparatus has been provided of very reduced size, which is not geometrically restrained, since it is possible to displace it in such a way as to obtain any desired contours, starting from the calibrated profiled member, through subsequent passages.

The invention, as disclosed, is susceptible to many modifications and variations, all of which are included within its scope.

In practicing the invention the used materials, provided that they are compatible with the intended use, as well as the contingent size and shapes may be any according to the needs.

I claim:

1. An apparatus for shaping in a calibrated way a preextruded rubber profiled member, particularly designed for regenerating tires and the like, characterized in that it comprises a pair of calibrating rollers, rotating in opposite directions, therebetween a preextruded rubber profiled member may be inserted, said member having a undefined cross-section, driving means being further provided for driving both said calibrating rollers with a like peripheric speed.

2. An apparatus for shaping in a calibrated way a preextruded rubber profiled member, according to the preceding claim, characterized in that it comprises a laying roller, rotatably supported by the shoulders of said apparatus, said shoulders or side walls also supporting said calibrating rollers, said laying roller being rotated with a peripheric speed which is the same as the speed of said calibrating rollers.

3. An apparatus for shaping in a calibrated way a preextruded rubber profiled member, according to claim 1, characterized in that said calibrating rollers are kinematically coupled through a first gear wheel and a second gear wheel, meshing with one another and keyed on the respective shafts of said calibrating rollers.

4. An apparatus for shaping in a calibrated way a preextruded profiled member, according to claim 2, characterized in that said laying or depositing roller is coupled to said gear wheels through a kinematic link consisting of a third gear wheel, meshing with the second gear wheel and coaxial and rotatably rigid with a first pignon 11, thereon a chain is entrained driving a second pignon keyed on the shaft of said laying roller.

5. An apparatus for shaping in a calibrated way a preextruded profile member according to claim 1, characterized in that it comprises means for feeding metal or textile weft threads, to be inserted into said profiled member, consisting of spools thereon threads or strips are wound effective to be unwound, through a transmission roller, on the first calibrating roller to be embedded into said calibrated profiled member.

6. An apparatus for shaping in a calibrated way a preextruded rubber profiled member, according to claim 2, characterized in that said laying roller is effective to lay said calibrated profiled member on a winding drum or tire carcasses to be regenerated.

* * * * *